US012596823B2

(12) United States Patent
Jost et al.

(10) Patent No.: US 12,596,823 B2
(45) Date of Patent: Apr. 7, 2026

(54) SYSTEM AND METHOD FOR PROTECTING INFORMATION

(71) Applicant: Microsoft Technology Licensing, LLC, Redmond, WA (US)

(72) Inventors: Uwe Helmut Jost, Groton, MA (US); Patrick A. Naylor, Reading (GB); Dushyant Sharma, Mountain House, CA (US); Ljubomir Milanovic, Vienna (AT); William F. Ganong, III, Brookline, MA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 411 days.

(21) Appl. No.: 18/190,722

(22) Filed: Mar. 27, 2023

(65) Prior Publication Data

US 2024/0330495 A1 Oct. 3, 2024

(51) Int. Cl.
*G06F 21/62* (2013.01)
*G06N 20/00* (2019.01)

(52) U.S. Cl.
CPC ......... *G06F 21/6218* (2013.01); *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 11,893,466 | B2 * | 2/2024 | Kamkar | .............. G06F 18/2148 |
| 2019/0005952 | A1 | 1/2019 | Kruse | |
| 2020/0050788 | A1 * | 2/2020 | Feuz | ....................... H04L 51/02 |
| 2021/0124800 | A1 * | 4/2021 | Williams | .............. G06F 40/295 |
| 2021/0201195 | A1 | 7/2021 | Vengertsev | |
| 2023/0105547 | A1 * | 4/2023 | Kamkar | ................. G06Q 40/03 |
| | | | | 705/38 |
| 2024/0095394 | A1 * | 3/2024 | Madhavan | .............. G06N 20/00 |

OTHER PUBLICATIONS

International Search Report and Written Opinion received for PCT Application No. PCT_US_2024019320 Jun. 3, 2024, 13 pages.
International Preliminary Report on Patentability (Chapter I) received for PCT Application No. PCT/US2024/019320 Oct. 9, 2025, 08 pages.

* cited by examiner

*Primary Examiner* — Hee K Song
(74) *Attorney, Agent, or Firm* — Foley IP Law, PLLC

(57) ABSTRACT

A method, computer program product, and computing system for receiving input content that may include sensitive information for processing by a machine learning model; processing the input content with the machine learning model to generate output content; processing the output content to determine if the output content includes any sensitive information; and if the output content includes any sensitive information, scrutinizing the input content to determine if the input content supports the inclusion of the sensitive information in the output content.

20 Claims, 2 Drawing Sheets

100

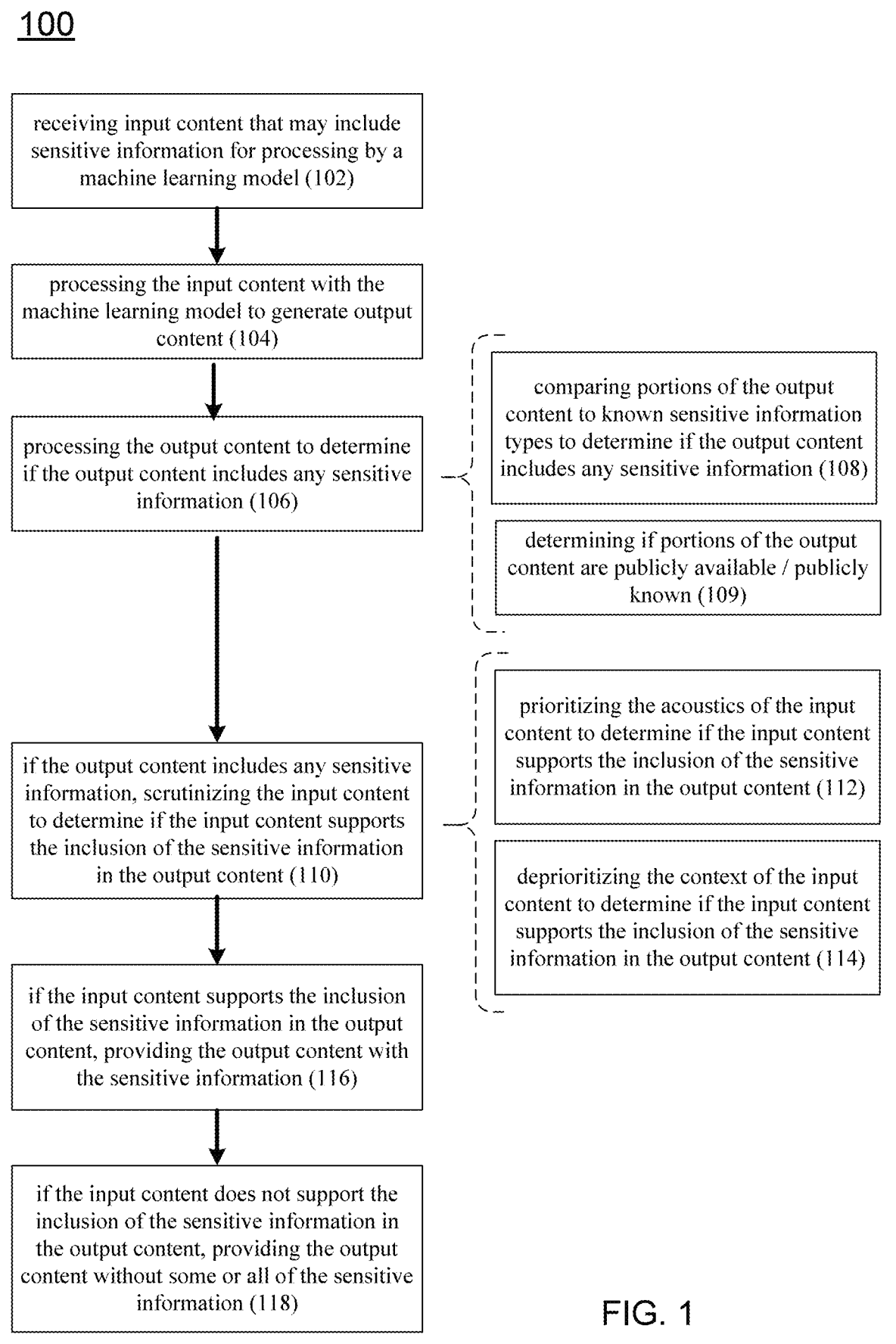

100

```
┌─────────────────────────────────┐
│ receiving input content that may include
│ sensitive information for processing by a
│ machine learning model (102)
└─────────────────────────────────┘
                 │
                 ▼
┌─────────────────────────────────┐
│ processing the input content with the
│ machine learning model to generate output
│ content (104)
└─────────────────────────────────┘
                 │
                 ▼
┌─────────────────────────────────┐
│ processing the output content to determine
│ if the output content includes any sensitive
│ information (106)
└─────────────────────────────────┘
```

┌─────────────────────────────────┐
│ comparing portions of the output
│ content to known sensitive information
│ types to determine if the output content
│ includes any sensitive information (108)
└─────────────────────────────────┘

┌─────────────────────────────────┐
│ determining if portions of the output
│ content are publicly available / publicly
│ known (109)
└─────────────────────────────────┘

```
┌─────────────────────────────────┐
│ if the output content includes any sensitive
│ information, scrutinizing the input content
│ to determine if the input content supports
│ the inclusion of the sensitive information
│ in the output content (110)
└─────────────────────────────────┘
```

┌─────────────────────────────────┐
│ prioritizing the acoustics of the input
│ content to determine if the input content
│ supports the inclusion of the sensitive
│ information in the output content (112)
└─────────────────────────────────┘

┌─────────────────────────────────┐
│ deprioritizing the context of the input
│ content to determine if the input content
│ supports the inclusion of the sensitive
│ information in the output content (114)
└─────────────────────────────────┘

```
┌─────────────────────────────────┐
│ if the input content supports the inclusion
│ of the sensitive information in the output
│ content, providing the output content with
│ the sensitive information (116)
└─────────────────────────────────┘
                 │
                 ▼
┌─────────────────────────────────┐
│ if the input content does not support the
│ inclusion of the sensitive information in
│ the output content, providing the output
│ content without some or all of the sensitive
│ information (118)
└─────────────────────────────────┘
```

FIG. 1

SYSTEM AND METHOD FOR PROTECTING INFORMATION

TECHNICAL FIELD

This disclosure relates to systems and methods for protecting information and, more particularly, to systems and methods for protecting information when available to machine learning models.

BACKGROUND

Sensitive information is information that, when used alone or with other relevant data, can disclose information that may be desirable to maintain in confidence. Examples of such information may include information that may identify an individual, information that may disclose corporate secrets, information that may disclose confidential records, etc. Sensitive information may contain direct identifiers (e.g., passport information) that can identify a person uniquely, quasi-identifiers (e.g., race) that can be combined with other quasi-identifiers (e.g., date of birth) to successfully recognize an individual, closely held secrets of an individual, a corporation or a business entity, trade secrets, business plans, and (generally speaking) information that is not publicly available.

Advancing technology platforms have changed the way businesses operate, governments legislate, and individuals relate. With digital tools like cell phones, the Internet, e-commerce, and social media, there has been an explosion in the supply of all kinds of data. Further, ML models may have access to such sensitive information. And as such ML models may be trained to enhance the user experience by e.g., predicting what information a user is providing or trying to receive, the possibility exists for the ML model to inadvertently provide such sensitive information in a quest to provide the user with what they believe they want, thus resulting in sensitive information leakage.

BRIEF DESCRIPTION OF THE DRAWINGS

FIG. 1 is a flow chart of one implementation of an information protection process.

Like reference symbols in the various drawings indicate like elements.

DETAILED DESCRIPTION OF THE PREFERRED EMBODIMENTS

Figure 2:
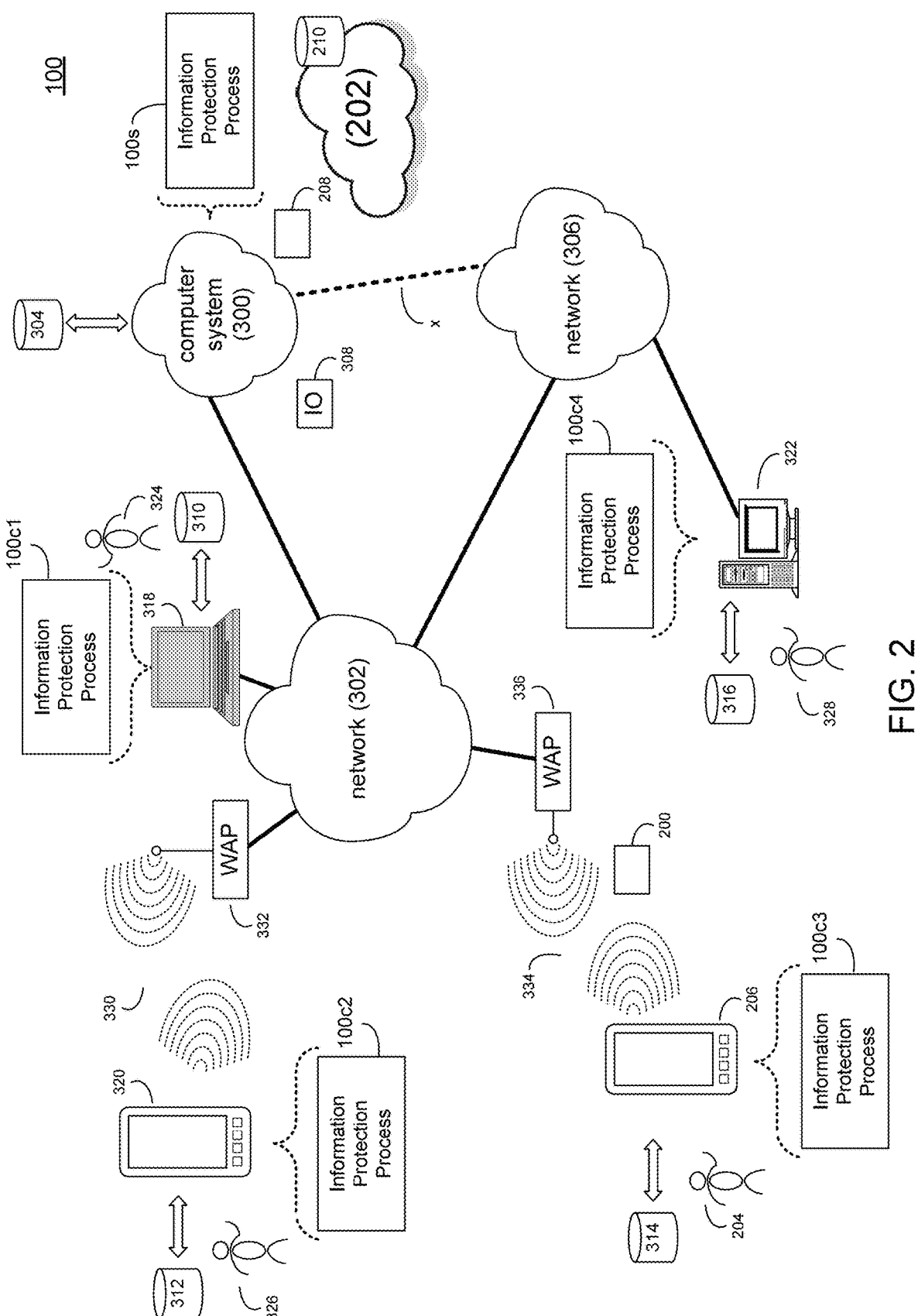
FIG. 2 is a diagrammatic view of a computer system and the information protection process coupled to a distributed computing network.

As will be discussed below in greater detail, implementations of the present disclosure are configured to prevent the inadvertent leakage of sensitive information. Specifically, such inadvertent leakage may occur when a machine learning model receives input content that is partially ambiguous and the machine learning model has access to such sensitive information (or had access to such sensitive information during model training). Accordingly, the machine learning model may rely upon (either partially or fully) context information concerning the input content to generate output content that eliminates the ambiguity of the input content (resulting in the leakage of such sensitive information).

Accordingly, an information protection process may be used to deprioritize reliance on such context information and/or prioritize reliance on acoustic information concerning the input content, thus reducing the likelihood of such inadvertent leakage of sensitive information within such output content. Specifically and as will be discussed below, the information protection process will scrutinize input content to determine if the input content supports the inclusion of sensitive information in the output content. And if it does not, the output content will be provided without some or all of the sensitive information.

The details of one or more implementations are set forth in the accompanying drawings and the description below. Other features and advantages will become apparent from the description, the drawings, and the claims.

The Information Protection Process:

Referring to FIGS. 1-2, there is shown information protection process 100. Specifically, information protection process 100 may receive 102 input content (e.g., input content 200) that may include sensitive information for processing by a machine learning model (e.g., machine learning model 202).

Machine learning (ML) is a field of inquiry devoted to understanding and building methods that 'learn', that is, methods that leverage data to improve performance on some set of tasks. It is seen as a part of artificial intelligence. Machine learning algorithms build a model based on sample data, known as training data, in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

Machine learning approaches are generally divided into three categories, depending on the nature of the signal available: supervised learning, unsupervised learning, and reinforcement learning. Supervised learning includes presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning generally includes a computing device interacting in a dynamic environment in which it must perform a certain goal (such as driving a vehicle or playing a game against an opponent). As the machine learning system navigates its problem space, the machine learning system is provided feedback that's analogous to rewards, which it tries to maximize.

Sensitive information refers to any information that may disclose content that is desirable to maintain in confidence. Examples of such information may include information that may identify an individual, information that may disclose corporate secrets, information that may disclose confidential records/reports/plans/strategies, etc.

Sensitive information can be collected and processed by organizations for a variety of purposes, such as employment, healthcare, financial services, forecasting, corporate governance, marketing, etc. However, it is important to protect sensitive information from unauthorized access or disclosure, as it can be used for identity theft, fraud, corporate extortion/malfeasance, or other malicious activities. Many countries have regulations in place to protect sensitive information, such as the General Data Protection Regulation (GDPR) in the European Union, the Health Insurance Portability and Accountability Act (HIPAA) in the United States, and the Personal Information Protection and Electronic Documents Act (PIPEDA) in Canada. These regulations require organizations to implement safeguards to protect sensitive information, such as encryption, access controls, and data retention policies.

An example of machine learning model 202 may include but is not limited to a speech recognition model that converts spoken text into a text-based transcript. While the following example concerns input content 200 being voice-based input content, this is for illustrative purpose only and is not intended to be a limitation of this disclosure, as other configurations are possible and are considered to be within the scope of this disclosure. Accordingly, other examples of input content 200 may include but are not limited to text-based input content (e.g., text-based input content that is provided via text-message or email that may include sensitive information) and image-based input content (e.g., license plate photographs or security camera imagery that may include sensitive information).

For this example, assume that user 204 is using machine learning model 202 (e.g., a speech recognition model) to generate a text-based transcript of the verbal content (e.g., input content 200) provided by user 204. Specifically, assume that the input content (e.g., input content 200) provided by user 204 is:

"John Smith was born on 26 Mar. 1953 and has a social security number of 123 (indecipherable)".

User 204 may provide input content 200 to information protection process 100 for processing by machine learning model 202 via a client electronic device (e.g., smart phone 206). While this example speaks of input content 200 being provided via smart phone 206, this is for illustrative purposes only and is not intended to be a limitation of this disclosure, as other configurations are possible and are considered to be within the scope of this disclosure. For example, user 204 may provide input content 200 via a handheld microphone, a lapel microphone, a traditional telephone, etc. Further, while this example speaks of input content 200 being directed towards information of a personal nature, this is for illustrative purposes only and is not intended to be a limitation of this disclosure, as other configurations are possible and are considered to be within the scope of this disclosure. For example, input content 200 may concern corporate earnings, business plans, confidential strategies, trade secrets, etc.

Information protection process 100 may process 104 the input content (e.g., input content 200) with the machine learning model (e.g., machine learning model 202) to generate output content (e.g., output content 208). Generally speaking, examples of the output content (e.g., output content 208) may include one or more of: a text-based summary of the input content (e.g., input content 200); a transcription of the input content (e.g., input content 200); and a voice-based response to the input content (e.g., a verbal answer to a question). As discussed above and for this example, assume that user 204 is using machine learning model 202 (e.g., a speech recognition model) to generate a text-based transcript of the verbal content (e.g., input content 200) provided by user 204. As discussed above and in this example, the input content (e.g., input content 200) provided by user 204 is as follows:

John Smith was born on 26 Mar. 1953 and has a social security number of 123 (indecipherable)

Further, assume that the output content (e.g., output content 208) generated by machine learning model 202 is as follows:

John Smith was born on 26 Mar. 1953 and has a social security number of 123-45-6789

Once output content 208 is generated (but before it is provided to user 204), Information protection process 100 may process 106 the output content (e.g., output content 208) to determine if the output content (e.g., output content 208) includes any sensitive information.

For example and when processing 106 the output content (e.g., output content 208) to determine if the output content (e.g., output content 208) includes any sensitive information, Information protection process 100 may compare 108 portions of the output content (e.g., output content 208) to known sensitive information types to determine if the output content (e.g., output content 208) includes any sensitive information.

Examples of such sensitive information types may include but are not limited to:

a corporate record type;

a trade secret type;

a business plan type;

a business strategy type;

an earnings report type;

a social security number type;

a birth date type;

a name type;

an address type;

an email address type; and a phone number type.

While eleven examples of sensitive information types are provided above, this is for illustrative purposes only and is not intended to be a limitation of this disclosure, as other configurations are possible and are considered to be within the scope of this disclosure. Further and while the examples of sensitive information types provided above generally concern personal or business information, this is for illustrative purposes only and is not intended to be a limitation of this disclosure, as other configurations are possible and are considered to be within the scope of this disclosure.

Accordingly and with respect to the input content (e.g., input content 200) provided by user 204 (namely "John Smith was born on 26 Mar. 1953 and has a social security number of 123 (indecipherable)"), information protection process 100 may compare 108 portions of the output content (e.g., output content 208) to known sensitive information types and determine that output content 208 includes the following underlined sensitive information:

John Smith was born on 26 Mar. 1953 and has a social security number of 123-45-6789

Specifically and in this particular example, there are three discrete portions of sensitive information included within the output content (e.g., output content 208), namely:

John Smith (i.e., a name type of sensitive information);

26 Mar. 1953 (i.e., a birth date type of sensitive information); and 123-45-6789 (i.e., a social security number type of sensitive information).

Additionally/alternatively and when processing 106 the output content (e.g., output content 208) to determine if the output content (e.g., output content 208) includes any sensitive information, information protection process 100 may determine 109 if portions of the output content (e.g., output content 208) are publicly available/publicly known. For example, if portions of the output content (e.g., output content 208) are available in public databases, public records, public information sources, such publicly-available/publicly-known information would not be deemed sensitive information. For example, if a corporate record and an earnings report were included within output content 208 but are publicly available via an SEC (Securities and Exchange Commission) database, information protection process 100 may deem such information to be non-sensitive information.

If the output content (e.g., output content 208) includes any sensitive information, information protection process 100 may scrutinize 110 the input content (e.g., input content 200) to determine if the input content (e.g., input content 200) supports the inclusion of the sensitive information in the output content (e.g., output content 208).

For example, were the three above-described portions of sensitive information included within the input content (e.g., input content 200)? So in other words, did user 204 specifically state the name, birthdate and social security number of "John Smith" within the input content (e.g., input content 200). If not, this sensitive information may have leaked into the output content (e.g., output content 208) from one or more sensitive information datastores (e.g., information datastore 210) that are accessible by machine learning model 202. Additionally/alternatively, such sensitive information may be baked into/trained into machine learning model 202, thus eliminating the need for a separate information datastore. Specifically and for various reasons, machine learning model 202 may have access to information datastore 210. However, machine learning model 202 should not generate content and should only process existing content (e.g., content that was included within the input content (e.g., input content 200)).

For example and when scrutinizing 110 the input content (e.g., input content 200) to determine if the input content (e.g., input content 200) supports the inclusion of the sensitive information in the output content (e.g., output content 208), information protection process 100 may:

prioritize 112 the acoustics of the input content (e.g., input content 200) to determine if the input content (e.g., input content 200) supports the inclusion of the sensitive information in the output content (e.g., output content 208); and/or deprioritize 114 the context of the input content (e.g., input content 200) to determine if the input content (e.g., input content 200) supports the inclusion of the sensitive information in the output content (e.g., output content 208).

As stated above, there are three discrete portions of sensitive information included within the output content (e.g., output content 208), namely:

John Smith (i.e., a name type of sensitive information);

26 Mar. 1953 (i.e., a birth date type of sensitive information); and 123-45-6789 (i.e., a social security number type of sensitive information).

As also stated above, the input content (e.g., input content 200) provided by user 204 is as follows:

John Smith was born on 26 Mar. 1953 and has a social security number of 123 (indecipherable)

Accordingly and with respect to each of the three discrete portions of sensitive information included within the output content (e.g., output content 208):

John Smith included within the output content (e.g., output content 208) is supported by the acoustics of the input content (e.g., input content 200), as user 204 clearly stated "John Smith" when (in this example) dictating input content 200;

26 Mar. 1953 included within the output content (e.g., output content 208) is supported by the acoustics of the input content (e.g., input content 200), as user 204 clearly stated "26 Mar. 1953" when (in this example) dictating input content 200; and 123-45-6789 included within the output content (e.g., output content 208) is NOT supported by the acoustics of the input content (e.g., input content 200), as user 204 did not clearly state "123-45-6789" when (in this example) dictating input content 200.

Specifically and concerning sensitive information "123-45-6789", a portion of this sensitive information "123-45-6789" (namely "123") is supported by the acoustics of the input content (e.g., input content 200), as user 204 clearly stated "123" when (in this example) dictating input content 200. However, another portion of this sensitive information "123-45-6789" (namely "45-6789") is not supported by the acoustics of the input content (e.g., input content 200), as user 204 did not clearly state "45-6789" when (in this example) dictating input content 200 (as it was inaudible)

As discussed above, when scrutinizing 110 the input content (e.g., input content 200) to determine if the input content (e.g., input content 200) supports the inclusion of the sensitive information in the output content (e.g., output content 208), information protection process 100 may prioritize 112 the acoustics of the input content (e.g., input content 200) to determine if the input content (e.g., input content 200) supports the inclusion of the sensitive information in the output content (e.g., output content 208). Accordingly and in this example, the acoustics (which are prioritized 112 by information protection process 100) support the inclusion of sensitive information "John Smith", "26 Mar. 1953" and (possibly) "123" within output content 208. However, the acoustics (which are prioritized 112 by information protection process 100) do not support the inclusion of sensitive information "45-6789" within output content 208, as sensitive information "45-6789" was indecipherable.

So being sensitive information "45-6789" included within output content 208 was indecipherable within input content 200, this portion of sensitive information was likely obtained from sensitive information datastore 210 for insertion into output content 208. Specifically, machine learning model 202 may use language modeling to analyze the "context" of the input content (e.g., input content 200) when generating output content 208. For example, just prior to "123" in input content 200 was the phrase "has a social security number of". Accordingly and through the use of such language modeling and context analysis, machine learning model 202 may "understand" that 123 (indecipherable) is supposed to be the complete social security number of "John Smith". And being machine learning model 202 has access to sensitive information datastore 210, machine learning model 202 may obtain the indecipherable portion of the social security number (namely 45-6789) and insert the same into output content 208 (resulting in sensitive information leakage). Therefore, this is the motivation for deprioritizing 114 the context of the input content (e.g., input content 200) when determining if the input content (e.g., input content 200) supports the inclusion of the sensitive information in the output content (e.g., output content 208).

Accordingly, if the input content (e.g., input content 200) supports the inclusion of the sensitive information in the output content (e.g., output content 208), information protection process 100 may provide 116 the output content (e.g., output content 208) with the sensitive information.

And conversely, if the input content (e.g., input content 200) does not supports the inclusion of the sensitive information in the output content (e.g., output content 208), information protection process 100 may provide 118 the output content (e.g., output content 208) without some or all of the sensitive information.

Continuing with the above stated example, information protection process 100 may provide output content 208 as follows:

"John Smith was born on 26 Mar. 1953 and has a social security number of XXX-XX-XXX" (when choosing to not provide any portion of the social security number of John Smith); and/or "John Smith was born on 26 Mar. 1953 and has a social security number of 123-XX-XXX" (when choosing to only provide the supported portion of the social security number of John Smith).

Importantly, information protection process 100 would NOT provide output content 208 as follows:

"John Smith was born on 26 Mar. 1953 and has a social security number of 123-45-6789" (as the inclusion of the complete social security number of John Smith within output content 208 is not supported by input content 200.

According and through the use of information protection process 100, attacks by scammers who intentionally provide ambiguous/inaudible/indecipherable input content in an attempt to obtain sensitive information through such leakage may be thwarted. For example, information protection process 100 may perform the above-described process of monitoring for sensitive content over an extended period of time. Accordingly, information protection process 100 may continuously monitor requests for such sensitive content and the patterns put forth by users in an attempt to obtain the same. For example, are there certain users . . . or certain IP addresses . . . or certain geographic locations repeatedly providing ambiguous/inaudible/indecipherable input content (e.g., input content 200) in an attempt to obtain sensitive information? If so, such users, IP addresses and/or geographic locations may be banned/blocked/subjected to a higher level of scrutiny in the future by information protection process 100. Additionally, information protection process 100 may identify suspicious patterns concerning the manner in which scammers attempt to obtain such sensitive information (e.g., via ambiguous/inaudible/indecipherable input content) and may use such identified patterns to prevent/limit future attempts by such scammers. Additionally still, information protection process 100 may monitor for patterns that utilize variations of sensitive content that could indicate a probing attack. For example, if there is a limited range of options, an attacker may try them all and see which one the system reacts to most positively.

System Overview:

In some implementations, PII protection process 100 is implemented as a server-side process, a client-side process, or a hybrid server-side/client-side process. For example, information protection process 100 may be implemented as a purely server-side process via information protection process 100s. Alternatively, information protection process 100 may be implemented as a purely client-side process via one or more of information protection process 100c1, information protection process 100c2, information protection process 100c3, and information protection process 100c4. Alternatively still, information protection process 100 may be implemented as a hybrid server-side/client-side process via information protection process 100s in combination with one or more of information protection process 100c1, information protection process 100c2, information protection process 100c3, and information protection process 100c4.

Accordingly, information protection process 100 as used in this disclosure may include any combination of information protection process 100s, information protection process

100c1, information protection process 100c2, information protection process 100c3, and information protection process 100c4.

In some implementations, information protection process 100s is a server application and resides on and may be executed by a computer system 300, which may be connected to network 302 (e.g., the Internet or a local area network). Computer system 300 may include various components, examples of which include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 300 may execute one or more operating systems.

The instruction sets and subroutines of information protection process 100s, which may be stored on storage device 304 coupled to computer system 300, may be executed by one or more processors (not shown) and one or more memory architectures (not shown) included within computer system 300. Examples of storage device 304 may include but are not limited to: a hard disk drive; a RAID device; a random access memory (RAM); a read-only memory (ROM); and all forms of flash memory storage devices.

Network 302 may be connected to one or more secondary networks (e.g., network 306), examples of which may include but are not limited to: a local area network; a wide area network; or an intranet, for example.

Various IO requests (e.g., IO request 308) may be sent from information protection process 100s, information protection process 100c1, information protection process 100c2, information protection process 100c3 and/or information protection process 100c4 to computer system 300. Examples of IO request 308 may include but are not limited to data write requests (i.e., a request that content be written to computer system 300) and data read requests (i.e., a request that content be read from computer system 300).

The instruction sets and subroutines of information protection process 100c1, information protection process 100c2, information protection process 100c3 and/or information protection process 100c4, which may be stored on storage devices 310, 312, 314, 316 (respectively) coupled to client electronic devices 318, 320, 206, 322 (respectively), may be executed by one or more processors (not shown) and one or more memory architectures (not shown) incorporated into client electronic devices 318, 320, 206, 322 (respectively). Storage devices 310, 312, 314, 316 may include but are not limited to: hard disk drives; optical drives; RAID devices; random access memories (RAM); read-only memories (ROM), and all forms of flash memory storage devices.

Examples of client electronic devices 318, 320, 206, 322 may include, but are not limited to a personal digital assistant (not shown), a tablet computer (not shown), laptop computer 318, smart phone 320, smart phone 206, personal computer 322, a notebook computer (not shown), a server computer (not shown), a gaming console (not shown), and a dedicated network device (not shown). Client electronic devices 318, 320, 206, 322 may each execute an operating system, examples of which may include but are not limited to Microsoft Windows™, Android™, iOS™, Linux™, or a custom operating system.

Users 324, 326, 204, 328 may access computer system 300 directly through network 302 or through secondary network 306. Further, computer system 300 may be connected to network 302 through secondary network 306, as illustrated with link line 334.

The various client electronic devices (e.g., client electronic devices 318, 320, 206, 322) may be directly or indirectly coupled to network 302 (or network 306). For example, laptop computer 318 is shown directly coupled to network 302 via a hardwired network connection. Further, personal computer 322 is shown directly coupled to network 306 via a hardwired network connection. Smart phone 320 is shown wirelessly coupled to network 302 via wireless communication channel 330 established between smart phone 320 and wireless access point (i.e., WAP) 332, which is shown directly coupled to network 302. WAP 332 may be, for example, an IEEE 802.11a, 802.11b, 802.11g, 802.11n, Wi-Fi™, and/or Bluetooth™ device that is capable of establishing wireless communication channel 330 between smart phone 320 and WAP 338. Smart phone 206 is shown wirelessly coupled to network 302 via wireless communication channel 334 established between smart phone 206 and WAP 336, which is shown directly coupled to network 302.

General:

The present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

receiving, from a user, input content for processing by a machine learning model;

processing, by the machine learning model, the input content to generate output content, the output content including sensitive information excluded from the input content that is not publicly available;

processing the output content to remove the sensitive information from the output content responsive to determining that the sensitive information in the output content is both excluded from the input content and not publicly available; and providing the processed output content to the user in response to the input content.

2. The computer implemented method of claim 1, wherein the machine learning model includes a speech recognition model.

3. The computer implemented method of claim 1, wherein the output content includes a voice-based response to the input content.

4. The computer implemented method of claim 1, wherein the input content includes voice-based input content.

5. The computer implemented method of claim 1, wherein the input content includes text-based input content.

6. The computer implemented method of claim 1, wherein the input content includes image-based input content.

7. The computer implemented method of claim 1, wherein the output content includes a text-based summary of the input content.

8. The computer implemented method of claim 1, wherein the output content includes a transcription of the input content.

9. The computer implemented method of claim 1, wherein the output content includes a voice-based response to the input content.

10. A computer program product residing on a non-transitory computer readable medium having a plurality of instructions stored thereon which, when executed by a processor, cause the processor to perform operations comprising:

receiving, from a user, input content for processing by a machine learning model;

processing, by the machine learning model, the input content to generate output content, the output content including sensitive information excluded from the input content that is not publicly available;

processing the output content to remove the sensitive information from the output content responsive to determining that the sensitive information in the output content is both excluded from the input content and not publicly available; and providing the processed output content to the user in response to the input content.

11. The computer program product of claim 10, wherein the machine learning model includes a speech recognition model.

12. The computer program product of claim 10, wherein the input content includes voice-based input content.

13. The computer program product of claim 10, wherein the input content includes text-based input content.

14. The computer program product of claim 10, wherein the input content includes image-based input content.

15. The computer program product of claim 10, wherein the output content includes a text-based summary of the input content.

16. The computer program product of claim 10, wherein the output content includes a transcription of the input content.

17. A computer-implemented method, executed on a computing device, comprising:

receiving, from a user, input content for processing by a machine learning model;

processing, by the machine learning model, the input content to generate output content, the output content including sensitive information excluded from the input content that is not publicly available;

processing the output content to remove the sensitive information from the output content responsive to determining both that the input content lacks support for inclusion of the sensitive information in the output content and that the sensitive information is not publicly available; and providing the processed output content to the user in response to the input content.

18. The computer implemented method of claim 17, wherein the output content includes a voice-based response to the input content.

19. The computer implemented method of claim 17, wherein the input content includes voice-based input content.

20. The computer implemented method of claim 17, wherein the input content includes text-based input content.

* * * * *